July 14, 1931.    H. GLAENZER    1,814,913
POPPET VALVE
Filed April 30, 1930    2 Sheets-Sheet 1

Inventor
Harry Glaenzer
by his Attorneys
Howson & Howson

July 14, 1931.  H. GLAENZER  1,814,913
POPPET VALVE
Filed April 30, 1930  2 Sheets-Sheet 2

Inventor:
Harry Glaenzer
by his Attorneys

Patented July 14, 1931

1,814,913

UNITED STATES PATENT OFFICE

HARRY GLAENZER, OF PHILADELPHIA, PENNSYLVANIA

POPPET VALVE

Application filed April 30, 1930. Serial No. 448,751.

My invention relates to certain improvements in poppet valves, and while the invention is especially adapted for use in poppet valves for the "Caprotti" valve gear as disclosed in the Caprotti Patent No. 1,549,712 dated August 11, 1925, it will be understood that it can be used in other types of valve mechanisms without departing from the essential features of the invention.

The object of the invention is to cheapen and facilitate the manufacture of this type of valve, as well as to provide some flexibility in the construction whereby cracks and strains may be eliminated. This construction allows the valve ring proper to be made of nickel chrome steel and the spider of ordinary steel, which materially cheapens the manufacture.

Figure 1:
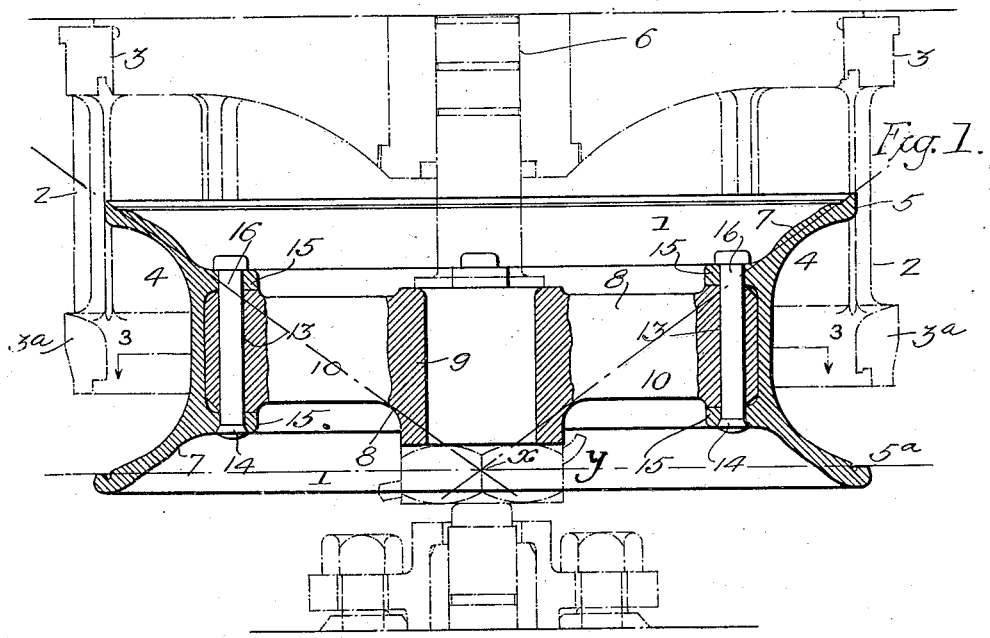
Fig. 1 is a transverse sectional view of my improved poppet valve, showing it located in the valve chest which is illustrated by dotted lines.
Figure 2:
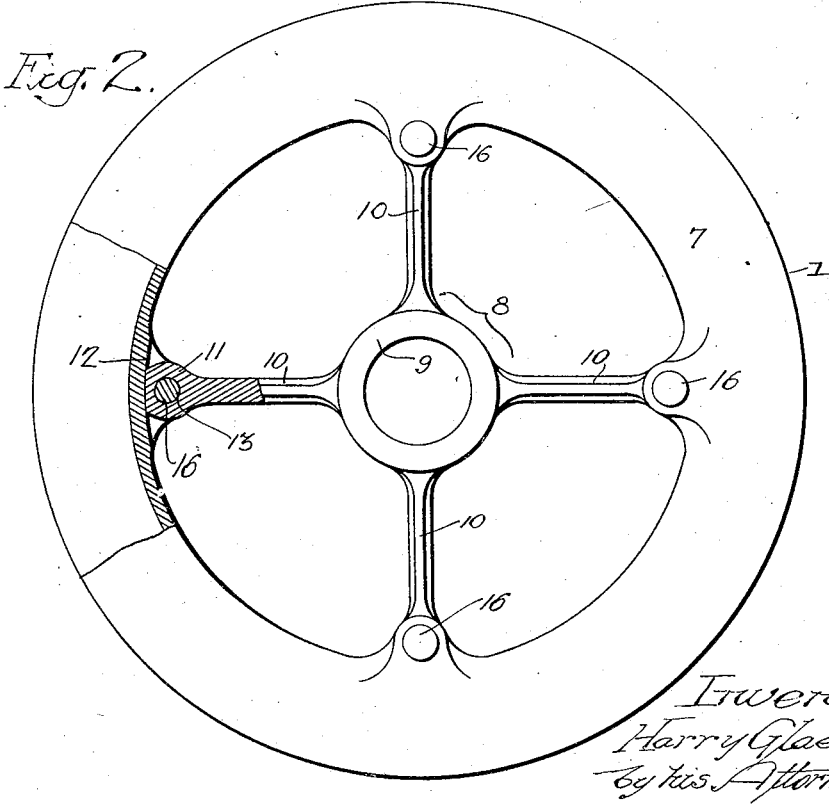
Fig. 2 is a plan view partly in section.
Figure 3:
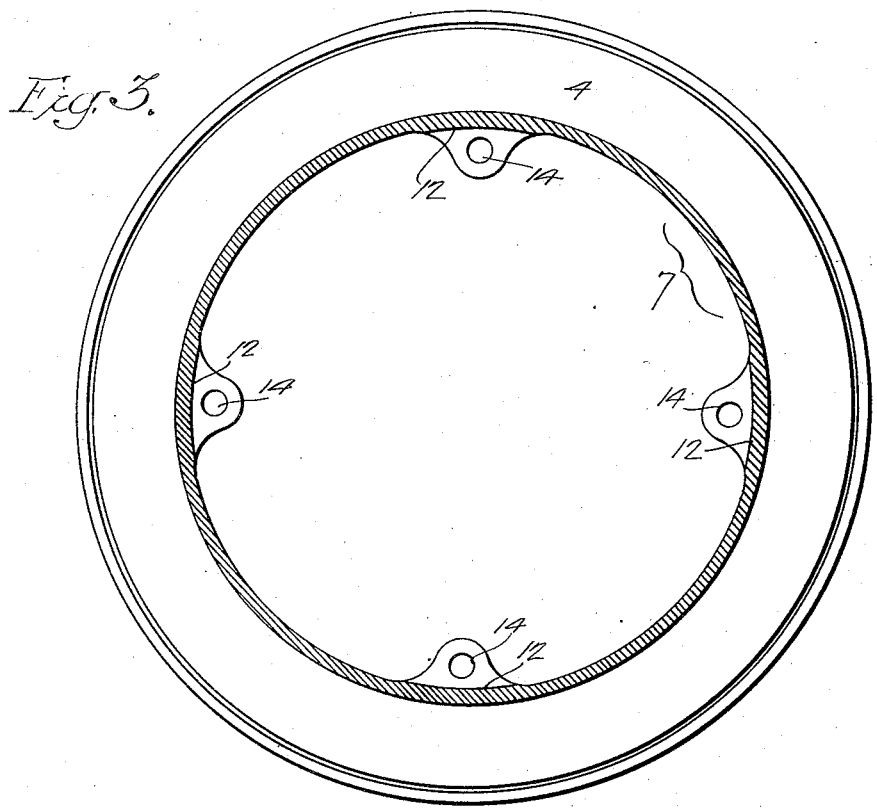
Fig. 3 is a sectional plan view on the line 3—3 of the valve ring.

1 is a poppet valve which in the present instance is located within a valve chest comprising a seat ring 2 having an upper seat 3 and a lower seat 3a connected as shown. The valve 1 is a double-seated valve and has an annular recess 4 therein, and at the lower end of the recess in the valve is a flat seat 5a. The upper seat 5 of the valve is conical, with its apex $x$ of the seat lying in the plane $y$ of the flat face. This arrangement secures a steam tight closure at all temperatures as any isotropic expansion of the valve or seat follows the law of geometric similarity. This particular design of valve especially fits it for use with the "Caprotti" valve gear, although the valve can be used wherever the requirement calls for a poppet valve.

Figure 4:
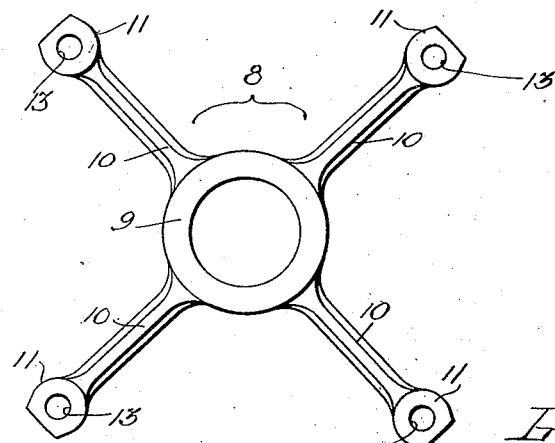
Fig. 4 is a plan view of the spider in a position to be inserted in the ring.

The valve 1 is mounted on a spindle 6 adapted to bearings in the parts of the valve chest shown by dotted lines. The particular construction of the chest forms no part of the present invention. The poppet valve 1 is made in two parts, a valve ring proper 7 and a spider 8. This spider has a hub 9, which is secured to the valve stem as shown and has arms 10 which are enlarged at their outer ends as at 11. The extreme ends of the arms are preferably slightly curved on the same curve as the pads 12 of the inner surface of the valve ring 7. The diameter of the opening in the ring at the pads is somewhat less than the diameter of the opening between the pads. This construction allows the ready assembly of the spider within the ring. The spider, being in the position shown in Fig. 4, can be dropped into the ring between the pads and then turned so that holes 13 in the spider will align with holes 14 in the inwardly projecting lugs 15 which extend above and below the spider as shown in the sectional view Fig. 1. Pins or bolts 16 are then inserted in the holes, locking the ring firmly to the spider. In the drawings a headed pin is shown which is driven into position and riveted so as to permanently secure the parts together.

I claim:

1. The combination in a valve, of a ring; inwardly projecting lugs on the ring; pads on the ring at the lugs; a spider having a hub and projecting arms, the ends of the arms fitting against the pads when in position; and means securing the arms to the lugs of the ring, the inner diameter of the ring being greater at the points between the lugs than at the lugs so that the spider can be readily inserted in the ring and turned into position.

2. The combination in a poppet valve, of a valve ring proper having an annular recess in its periphery; a seat at the lower end of the recess and a seat on the ring above the upper edge of the recess, the first-mentioned seat being flat and the other seat being conical; a spider; and means for securing the spider to the valve ring proper.

3. The combination in valve mechanism, of a valve chest having upper and lower seats; a valve spindle; a spider having a hub mounted on the spindle, said hub having arms; a valve ring proper having an annular recess therein and upper and lower seats, the upper seat being conical and the lower seat being flat and adapted to the seats of the valve chest; and means for securing the valve ring proper to the arms of the spider.

HARRY GLAENZER.